United States Patent
Cohen et al.

(10) Patent No.: US 12,021,926 B1
(45) Date of Patent: Jun. 25, 2024

(54) LOCKLESS, LEADERLESS PROTOCOL FOR SCALABLE APPLICATIONS

(71) Applicant: Amazon Technologies, Inc., Seattle, WA (US)

(72) Inventors: Ernest S Cohen, Wyncote, PA (US); Arkady Michael Degtiarov, Newton, MA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 18/452,727

(22) Filed: Aug. 21, 2023

(51) Int. Cl.
*H04L 67/1095* (2022.01)
*G06F 16/13* (2019.01)
*H04L 67/1097* (2022.01)

(52) U.S. Cl.
CPC ........ *H04L 67/1095* (2013.01); *G06F 16/134* (2019.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 7,243,142 | B2 * | 7/2007 | Poirot | H04L 43/0817 709/224 |
| 9,378,059 | B2 | 6/2016 | Huetter et al. | |
| 10,127,260 | B2 | 11/2018 | Goel et al. | |
| 10,552,402 | B2 | 2/2020 | Eluri et al. | |
| 2011/0191303 | A1 * | 8/2011 | Kaufman | G06F 7/00 707/684 |
| 2016/0283498 | A1 * | 9/2016 | Beaverson | G06F 16/9017 |
| 2017/0329830 | A1 * | 11/2017 | Simitsis | G06F 16/2379 |

OTHER PUBLICATIONS

Zhengwei et al., "Restricting the Number of Times That Data Can Be Accessed in Cloud Storage Using TrustZone", May 1, 2022, IEEE, 2022 22nd IEEE International Symposium on Cluster, Cloud and Internet Computing (CCGrid) (pp. 289-296) (Year: 2022).*

* cited by examiner

*Primary Examiner* — Davoud A Zand
(74) *Attorney, Agent, or Firm* — S. Scott Foster; Kowert, Hood, Munyon, Rankin & Goetzel, P.C.

(57) ABSTRACT

Systems and methods for implementing lockless, leaderless transaction protocols for scalable applications such as distributed data stores are disclosed. Applications may be implemented using multiple nodes individually implementing all or a subset of lockless, leaderless protocols. A transaction, such as a write to a data object, may be received at a node, the operation including a user-provided key. A composite key may be generated using a monotonic sequence number, the composite key globally unique across the application. A new data object is created based on data provided and once the object is created, the object is immutable. Other operations are implemented such that no data object may be written, modified, or deleted by more than one operation, thus eliminating contention and allowing for lock-free operation. Leaderless operation, as well as replication using erasure coding and redundant data paths, further minimize latency of the protocol.

20 Claims, 10 Drawing Sheets

LOCKLESS, LEADERLESS PROTOCOL FOR SCALABLE APPLICATIONS

BACKGROUND

Commoditization of computer hardware and software components has led to the rise of service providers that provide computational and storage capacity as a service. At least some of these services, such as database services, are implemented in distributed fashion in order to provide durability and availability of data. In this way, workloads for client applications can be distributed amongst multiple components of a distributed database system in order to provide consistent performance.

Figure 1:
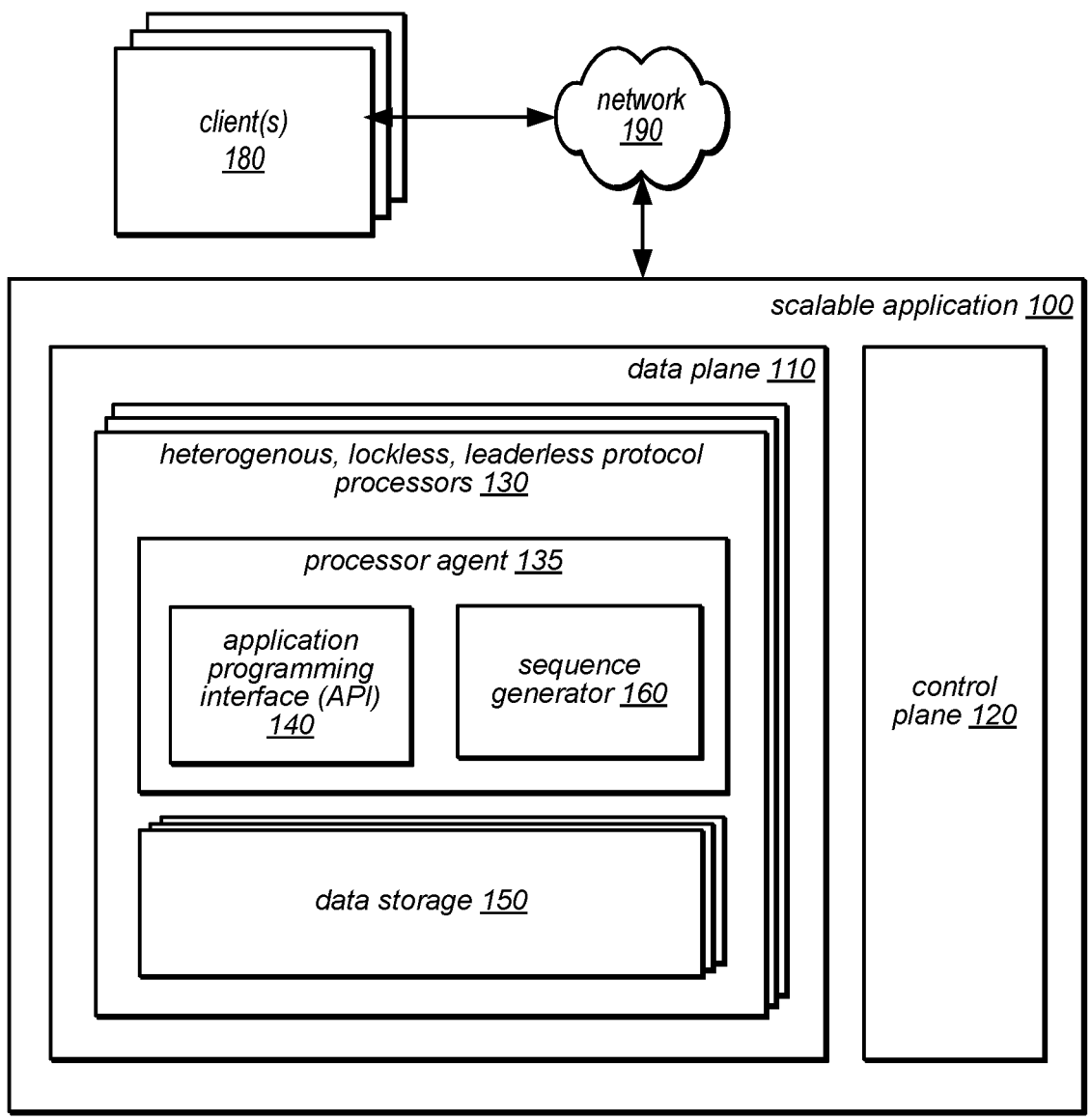
FIG. 1 is a logical block diagram illustrating a scalable application implementing a lockless, leaderless transaction protocol for scalable applications, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Commoditization of computer hardware and software components has led to the rise of service providers that provide computational and storage capacity as a service. At least some of these services, such as database services, are implemented as distributed applications in order to provide durability and availability of data. In this way, workloads for client applications can be distributed amongst multiple components of a distributed database application in order to provide consistent performance.

There are many issues, however, that limit the scalability of these applications. For example, implementation of the application may dictate that certain operations only be performed at certain components, known as leader nodes. Another limitation may be communications latencies that arise from the distributed nature of the application, especially considering increasing needs for durability and availability of data and wide geographic distribution of clients of the data. Yet another limitation is the need to serialize access to both client data and internal data to prevent corruption of client data or the application itself. These issues cumulatively set limits on the scalability of such distributed services.

Various embodiments of implementing lockless, leaderless transaction protocols for scalable applications such as distributed data stores are described herein. Applications may be implemented using multiple nodes individually implementing all or a subset of a lockless, leaderless protocol. A transaction, such as a write to a data object, may be received at a node, the operation including a user-provided key. A composite key may be construct using a sequence number generated monotonically, the composite key globally unique across the application. A new data object is created based on data provided and once the object is created, the object is immutable. Other operations are implemented such that no data object may be written, modified, or deleted by more than one operation, thus eliminating contention and allowing for lock-free operation. Leaderless operation may ensure that a greatest number of nodes may be employed to maximize parallelism.

Furthermore, applications that synchronously replicate over large networks (such as Wide Area Networks (WANs), like the Internet) tend to be highly sensitive to outlier latencies in paths over the WAN. This may be because database updates may need to be replicated in order, so one slow update slows down all updates (or a subset of updates in a "shard" or other portion of a database) replicating in the database.

WANs and other large networks may contain multiple redundant paths that provide alternative routes between destinations, such as between different instances of a database which replicate updates. While these redundant paths tend to have similar overall frequency distributions, their outlier latencies may not be highly correlated in time. Techniques described herein take advantage of multiple redundant paths using Erasure Coding schemes. For example, by breaking an update to be replicated into a number of chunks k, where a replication message describing the update can be recreated with N chunks where N<k, the k chunks may be sent over redundant network paths and reconstruct the message when the first N arrive. This significantly reduces the tail/outlier latency experienced by the chunk end-to-end. Accordingly, outlier latencies may be treated as binary erasures, and apply erasure coding as a forward error correction scheme. Such techniques can reduce the overall latency of replication schemes, particularly synchronous replication schemes or other replication schemes that rely upon application of replicated updates in order, for distributed database systems. Allowing, for example, distributed database systems with very wide distributions (e.g., across different data centers, geographic regions, or continents) to have highly performant, synchronous replication that does not sacrifice performance to achieve consistency.

In various embodiments, different erasure coding schemes may be used. In some embodiments, a simple parity (for N=k+1) technique, Reed-Solomon technique and other Maximum Distance Separable Codes (for arbitrary N>k) technique may be applied. In some embodiments, rateless erasure coding schemes such as Fountain codes and Raptor codes, may be implemented, which can further reduce overhead by avoiding sending redundant information unless a response is not received in a reasonable time.

FIG. 1 is a logical block diagram illustrating a scalable application implementing a lockless, leaderless transaction protocol for scalable applications, according to some embodiments. A scalable application 100 may make application services available to clients 180 over a network 190 via various application programming interfaces (APIs) 140. In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The scalable application 100 may employ a number of heterogeneous, lockless, leaderless transaction processors 130 of a data plane 110 implementing respective portions of a leaderless, lockless transaction protocol. Processor agents 135 of the individual processors may independently process operations without coordination with other ones of the processors, allowing processing to be both leaderless and lockless. In addition, individual processors may implement only portions of the transaction protocol. For example, some processors may implement get or read operations while not supporting list operations and other processors may implement list operations while not supporting get or read operations. By allowing processors to be heterogeneous, the scalable application enables individual processors to maintain internal data in a manner best suited to the portion of the protocol implemented. For example, processors that support list operations may index data objects in a manner that most efficiently supports list operations, even if such organization is not suitable for portions of the protocol that that processor does not directly support. The scalable application 100 may then employ sets of processors supporting various different portions of the protocol in proportion to the anticipated load of each operation of the protocol. For example, the application may employ more processors supporting get operations than list operations. Finally, it should be noted that some operations of the protocol, for example update, write, put and delete operations, may be highly desirable to support within each processor as individual processors may maintain individual copies of data objects. It should be understood that such protocols may employ a variety of different operations distributed in a variety of ways across heterogeneous processors in various embodiments and the above examples are not intended to be limiting.

Because some processors may not implement particular operations, in some embodiments the application may implement routing of operations to appropriate processors. In some embodiments, this routing function may be implemented within each of the processors themselves while in other embodiments, operations may first be submitted to a gateway that distributes requests to respective processors based on load and operation type. These are merely examples of operation request distribution are not intended to be limiting.

The scalable application 100 may employ a sequence generator 160 that generates sequence numbers monotonically, either strictly increasing or strictly decreasing, to create sequences that may be unambiguously determined and that are globally unique across the scalable application. These sequence numbers may be used to generate an identifier, or composite key, that includes at least the user key and optional versioning information. This sequence number may be generated without use of a global lock despite potential parallel access by various transaction processing nodes within the scalable application. Various embodiments of a sequencer 130 may be envisioned, such as by using atomic operations, such that embodiments of lockless, leaderless transaction protocol are not limited by the scope of the sequence number. Furthermore, transaction protocols may be envisioned that employ sequence number generators employing locks. Thus, various embodiments of these transaction protocols should not be considered limited to any specific sequence number generator.

Scalable application 100 may implement control plane 140. Control plane 140 may implement various features for managing the resources and operations for creating and performing data operations. For example, control plane 140 may implement various access control mechanisms or authentication techniques to ensure that requests to perform operations are made with appropriate authorization. Control plane 140 may implement various health or other system monitoring features to ensure that various features or components are functioning correctly, repaired, or replaced.

The specification provides example network-based distributed applications that employ lockless, leaderless protocols and performs synchronous database replication using erasure coding. Included in the description are various aspects of the example applications such as database instances, and separate storage services. The specification then describes flowcharts of various embodiments of methods for lockless, leaderless protocols and synchronous database replication using erasure coding. Next, the specification describes an example system that may implement the disclosed techniques. Various examples are provided throughout the specification.

Figure 2:
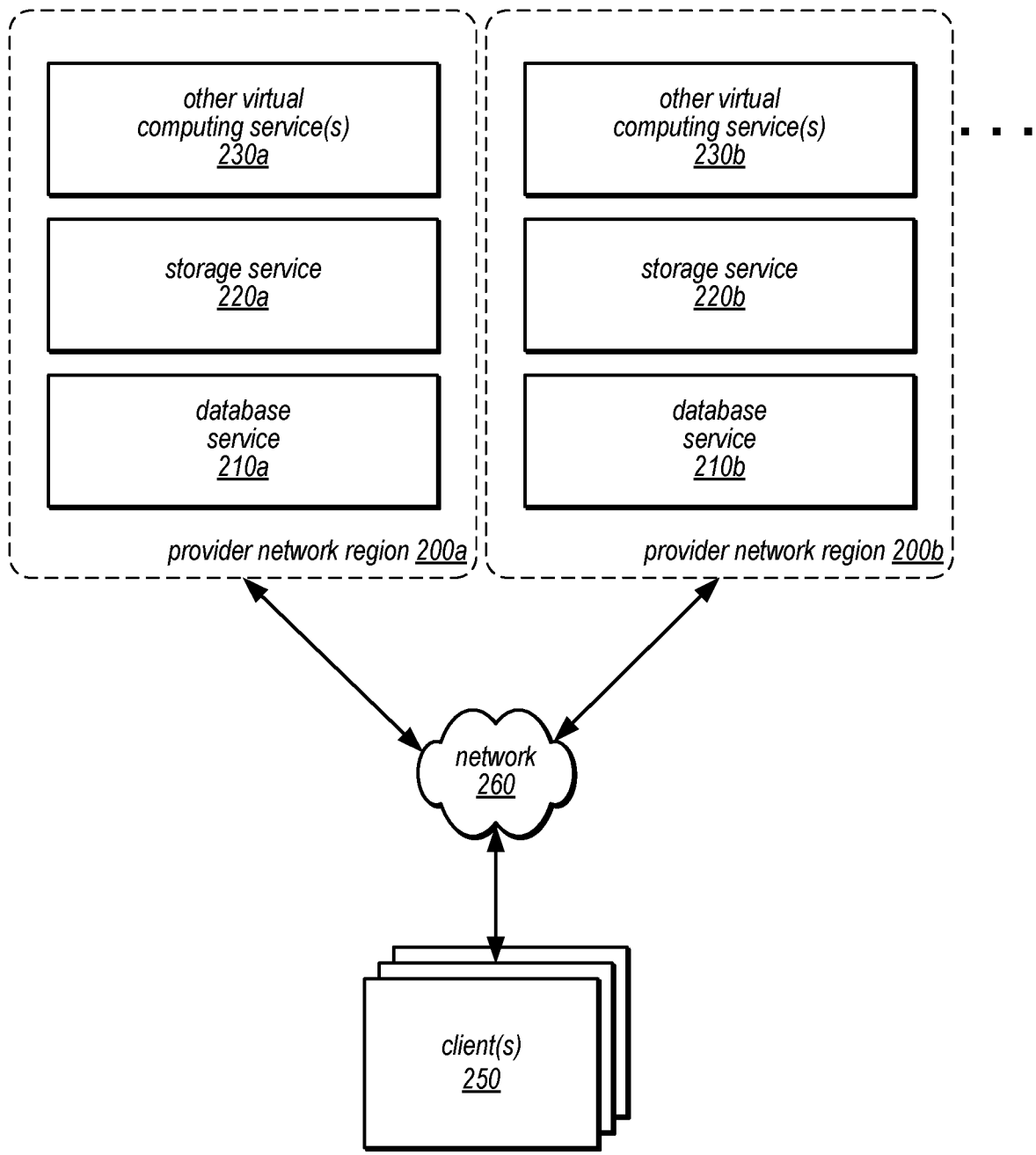
FIG. 2 is a block diagram illustrating provider network regions that may implement data services that implement lockless, leaderless transaction protocols, according to some embodiments.

FIG. 2 is a block diagram illustrating provider network regions that may implement database services that implement techniques for synchronous database replication using erasure coding, according to some embodiments. A provider network (sometimes referred to as a "cloud provider network" or "cloud") refers to a pool of network-accessible computing resources (such as compute, storage, and networking resources, applications, and services), which may be virtualized or bare-metal. The provider network can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the provider network via a publicly accessible network (e.g., the Internet, a cellular communication network) by way of a transit center (TC). TCs can be considered as the primary backbone locations linking users to the provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The provider network may deliver content from points of presence outside of, but networked with, these regions by way of edge locations and regional edge cache servers (points of presence, or PoPs). This compartmentalization and geographic distribution of computing hardware enables the provider network to provide low-latency resource access to users on a global scale with a high degree of fault tolerance and stability.

The provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the provider network, which may be provisioned in user accounts.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

As depicted in FIG. 2, an exemplary provider network may include numerous provider network regions 220*a*, 220*b*, and so on that may include one or more data centers hosting various resource pools, such as collections of physical and/or virtualized computer servers, storage devices, networking equipment and the like (e.g., computing system 1000 described below with regard to FIG. 5), needed to implement and distribute the infrastructure and storage services offered by the provider network within the provider network regions 200.

In the illustrated embodiment, a number of clients (shown as clients 250 may interact with a provider network 200 via a network 260. Provider network may implement respective instantiations of the same (or different) services, a database service 210a for region 200a and database service 210b for region 200b, a storage service 220a for region 200a and storage service 220b for region 220b, as well as various other virtual computing services 230a and 230b respectively. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 5 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to one or more of provider network regions 200a or 200b via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with service of a region of a provider network. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within a service of the provider network (e.g., a client application of database service 210a may be implemented on one of other virtual computing service(s) 230a in region 200a), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database data to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to the provider network may be coordinated by client 250 and the operating system or file system on behalf of applications executing within the operating system environment.

Clients 250 may convey network-based services requests to and receive responses from a region of the provider network via network 260. In various embodiments, network 260 may encompass any suitable combination of networking hardware and protocols necessary to establish network-based communications between clients 250 and provider network regions 200a and 200b. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and the provider network region may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network regions 200a and 200b. It is noted that in some embodiments, clients 250 may communicate with regions of a provider network using a private network rather than the public Internet. For example, clients 250 may be provisioned within the same enterprise as a database service. In such a case, clients 250 may communicate with a provider network region entirely through a private network 260 (e.g., a LAN or WAN that may use Internet-based communication protocols but which is not publicly accessible).

Generally speaking, provider network regions 200a and 200b may implement one or more service endpoints may receive and process network-based services requests, such as requests to access a database (e.g., queries, inserts, updates, etc.) and/or manage a database (e.g., create a database, configure a database, etc.). For example, a provider network region may include hardware and/or software may implement a particular endpoint, such that an HTTP-based network-based services request directed to that endpoint is properly received and processed. In one embodiment, a provider network region may be implemented as a server system may receive network-based services requests from clients 250 and to forward them to components of a system that implements database service 210a or 210b, storage service 220a or 220b and/or another virtual computing service 230a or 230b for processing. In other embodiments, provider network region may be configured as a number of distinct systems (e.g., in a cluster topology) implementing load balancing and other request management features may dynamically manage large-scale network-based services request processing loads. In various embodiments, a provider network region may be may support REST-style or document-based (e.g., SOAP-based) types of network-based services requests.

In addition to functioning as an addressable endpoint for clients' network-based services requests, in some embodiments, a provider network region may implement various client management features. For example, provider network region 200a may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network regions may also implement financial accounting and billing systems, or may maintain a database of usage data that may be queried and processed by external systems for reporting and billing of client usage activity. In certain embodiments, provider network regions may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210a or 210b, storage service 220a or 220b and/or another virtual computing service 230a or 230b (or the underlying systems that implement those services).

In some embodiments, provider network regions may also implement user authentication and access control procedures. For example, for a given network-based services request to access a particular database table, a provider network region ascertain whether the client 250 associated with the request is authorized to access the particular database table. Provider network regions may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, the provider network region may reject the corresponding network-based services request, for example by returning a response to the requesting client 250 indicating an error condition. Various access control policies may be stored as records or lists of access control information by database services 210a or 210b, storage services 220a or 220b and/or other virtual computing services 230a or 230b.

Note that in many of the examples described herein, services, like database service or storage service may be internal to a computing system or an enterprise system that provides database services to clients 250, and may not be exposed to external clients (e.g., users or client applications). In such embodiments, the internal "client" (e.g., database service 210a) may access storage service 220a over a local or private network (e.g., through an API directly between the systems that implement these services). In such embodiments, the use of storage service 220a in storing database tables on behalf of clients 250 may be transparent to those clients. In other embodiments, storage services 220a or 220b may be exposed to clients 250 through provider network region 200a or 200b to provide storage of database tables or other information for applications other than those that rely on database service 210a or 210b for database management. In such embodiments, clients of the storage service 220a or 220b may access storage service 220a or 220b via network 260 (e.g., over the Internet). In some embodiments, a virtual computing service 230a or 230b may receive or use data from storage service 220a or 220b (e.g., through an API directly between the virtual computing service 230a or 230b and storage service 220a or 220b) to store objects used in performing computing services 230a or 230b on behalf of a client 250. In some cases, the accounting and/or credentialing services of provider network region may be unnecessary for internal clients such as administrative clients or between service components within the same enterprise.

Various embodiments of synchronous database replication using erasure coding are described blow. Databases that synchronously replicate over large networks (such as Wide Area Networks (WANs), like the Internet) tend to be highly sensitive to outlier latencies in paths over the WAN. This may be because database updates may need to be replicated in order, so one slow update slows down all updates (or a subset of updates in a "shard" or other portion of a database) replicating in the database.

WANs and other large networks may contain multiple redundant paths that provide alternative routes between destinations, such as between different instances of a database which replicate updates. While these redundant paths tend to have similar overall frequency distributions, their outlier latencies may not be highly correlated in time.

In various embodiments, techniques are described that take advantage of multiple redundant paths using Erasure Coding schemes. For example, by breaking an update to be replicated into a number of chunks k, where a replication message describing the update can be recreated with N chunks where N<k, the k chunks may be sent over redundant network paths and reconstruct the message when the first N arrive. This significantly reduces the tail/outlier latency experienced by the chunk end-to-end. Accordingly, outlier latencies may be treated as binary erasures, and apply erasure coding as a forward error correction scheme. Such techniques can reduce the overall latency of replication schemes, particularly synchronous replication schemes or other replication schemes that rely upon application of replicated updates in order, for distributed database systems. Allowing, for example, distributed database systems with very wide distributions (e.g., across different data centers, geographic regions, or continents) to have highly performant, synchronous replication that does not sacrifice database performance to achieve consistency.

In various embodiments, different erasure coding schemes may be used. In some embodiments, a simple parity (for N=k+1) technique, Reed-Solomon technique and other Maximum Distance Separable Codes (for arbitrary N>k) technique may be applied. In some embodiments, rateless erasure coding schemes such as Fountain codes and Raptor codes, may be implemented, which can further reduce overhead by avoiding sending redundant information unless a response is not received in a reasonable time.

Figure 3:
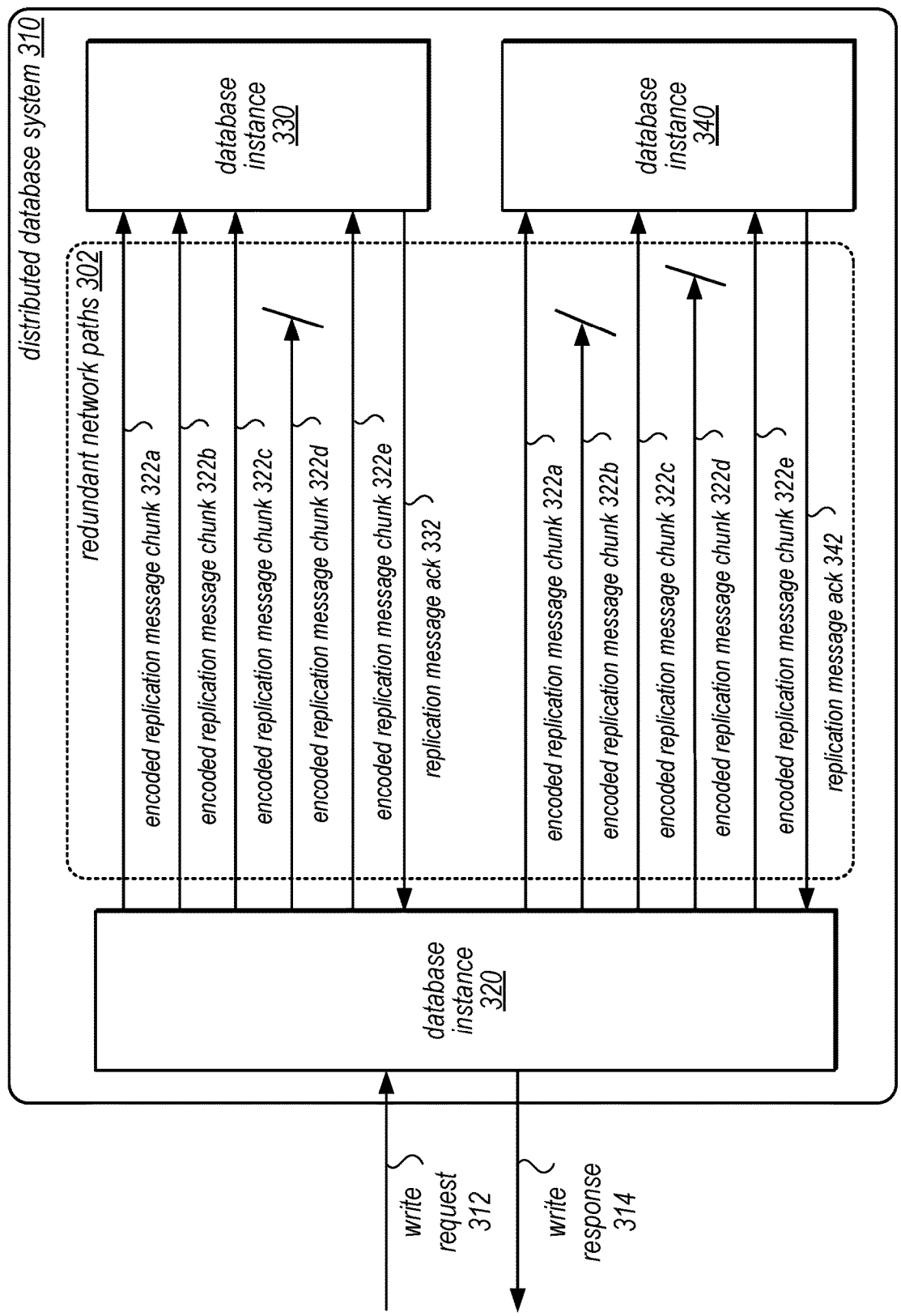
FIG. 3 is a logical block diagram illustrating synchronous database replication using erasure coding, according to some embodiments.

FIG. 3 is a logical block diagram illustrating synchronous database replication using erasure coding, according to some embodiments. In FIG. 3, distributed database system 310 may be a stand-alone database system (e.g., implemented on private network systems or services or implemented by a user of a cloud or other provider network, like the provider network discussed in detail above with regard to FIG. 2). In some embodiments, distributed database system 310 may be database service, like database service 210 as shown in FIG. 2, which may be implemented and managed by a provider network. Distributed database system 310 may be one of many different types of database, including types that support different kinds of access to database data, such as through the use of a query language like Structured Query Language (SQL) or APIs or other commands that provide a NoSQL interface. Different types of databases may store data for the database in different formats and according to different data models. For instance, one type of database may use a relational data model that imposes a common schema for a table of the relational database and another type of database may use a non-relational data model that imposes a flexible schema, which may not be common across different items or objects in the database. Databases may store various types of data including, but not limited to, graph databases storing data using a graph data model, time series databases storing time series data, key-value database that use a unique key-value to lookup data objects of various data types or formats in the database, or document databases that store data as a document with varying attributes, including nested data.

Distributed database 310 may store a database in a storage system which may be attached or accessible to database instances 320, 330, and 340. In some embodiments, a non-distributed storage system may be implemented to store a database. In other embodiments, the database may be stored in a distributed data storage system, such as storage service 220 discussed in FIG. 2. Database instances, such as database instances, 320, 330 and 340 may be implemented as instances, nodes, or other independent applications that can include one or more multiple layers in a database system application stack, implemented together on a common node, server, instance, or separated across different layers of nodes, servers, or other host systems, in various embodiments, which may or not implement virtualization to execute some or all components, functions, or workflows as a virtual machine, instance, container, microVM, or other form of compute capacityIn some embodiments, these host systems may be distributed (e.g., in different data centers or other different locations, such as on different server racks) so as to avoid common failure scenarios where both host systems may have correlated or simultaneous failure. In some embodiments, a database instance may include multiple ones (or all of the various features or functionalities discussed, such as handling both write adjudication, query processing/performance, and replication). Thus, the term database instance may not be limited to a single component, in some embodiments, but may represent the location of database functionality in a given location, such as a database instance in a region of a database service.

As depicted in FIG. 3, database instance 320 may receive a write request 312. The write request 312 may be a stand-alone request (e.g., an UPDATE or INSERT statement in SQL) or may be received as part of a larger transaction of multiple read and/or other write requests. Database instance 320 may process the write request 312 and perform synchronous replication to database instance 330 and database instance 340. As indicated at 302, communications between database instance 320 may utilize redundant network paths 302 which may provide alternative routes for communications between database instances 320, 330, and 340.

In the illustrated example, to perform synchronous replication of the write, database instance 320 may divide and encode a replication message (e.g., a communication indicating an update for inclusion in a journal or other database system data store that authoritatively commits writes to the database) into multiple chunks (e.g., 322a, 322b, 322c, 322d, and 322e), which may be separately sent across redundant network paths 302 to database instances 340 and 330 respectively. Various different protocols may reply upon synchronized performance of replication messages and replication messages may take various formats (e.g., single or multi-phase commits or other agreement or conflict resolution protocols). In various embodiments, replication messages may be generated for processing as an ordered stream of updates, such that for one replication message update to be applied, all previous updates in the ordered stream of updates described in earlier replication messages may have to be received.

In the event that some message chunks fail to be received at a database instance (e.g., 322d for database instance 330 and 322b and 322d for database instance 340), each database instance may still be able to reassemble the replication message, apply the write, and return a message acknowledgement, as indicated at 332 and 342. In this way, database instance 320 may, after receiving the acknowledgments from the database instances 330 and 340, return a response 314 indicating that the write has been committed to the database. Such techniques improve not only reducing likely network failures from causing individual replication messages to be lost, but also reduce the negative effects such losses have when they are one replication message in an ordered stream of updates and their loss will hold up all subsequent updates from being applied.

Please note, FIG. 3 is provided as a logical illustration of a distributed database system and its respective components, as well as respective interactions and is not intended to be limiting as to the physical arrangement, size, or number of components, modules, or devices to implement such features. For example, cross region replication techniques may also involve sending messages across provider network regions (though internal region replication may also be performed). Additional multiple components may be involved, distributing the responsibilities of a database instance 320 across multiple components (e.g., a query processor, adjudicator, and so on as illustrated below with regard to FIGS. 3-5).

Figure 4:
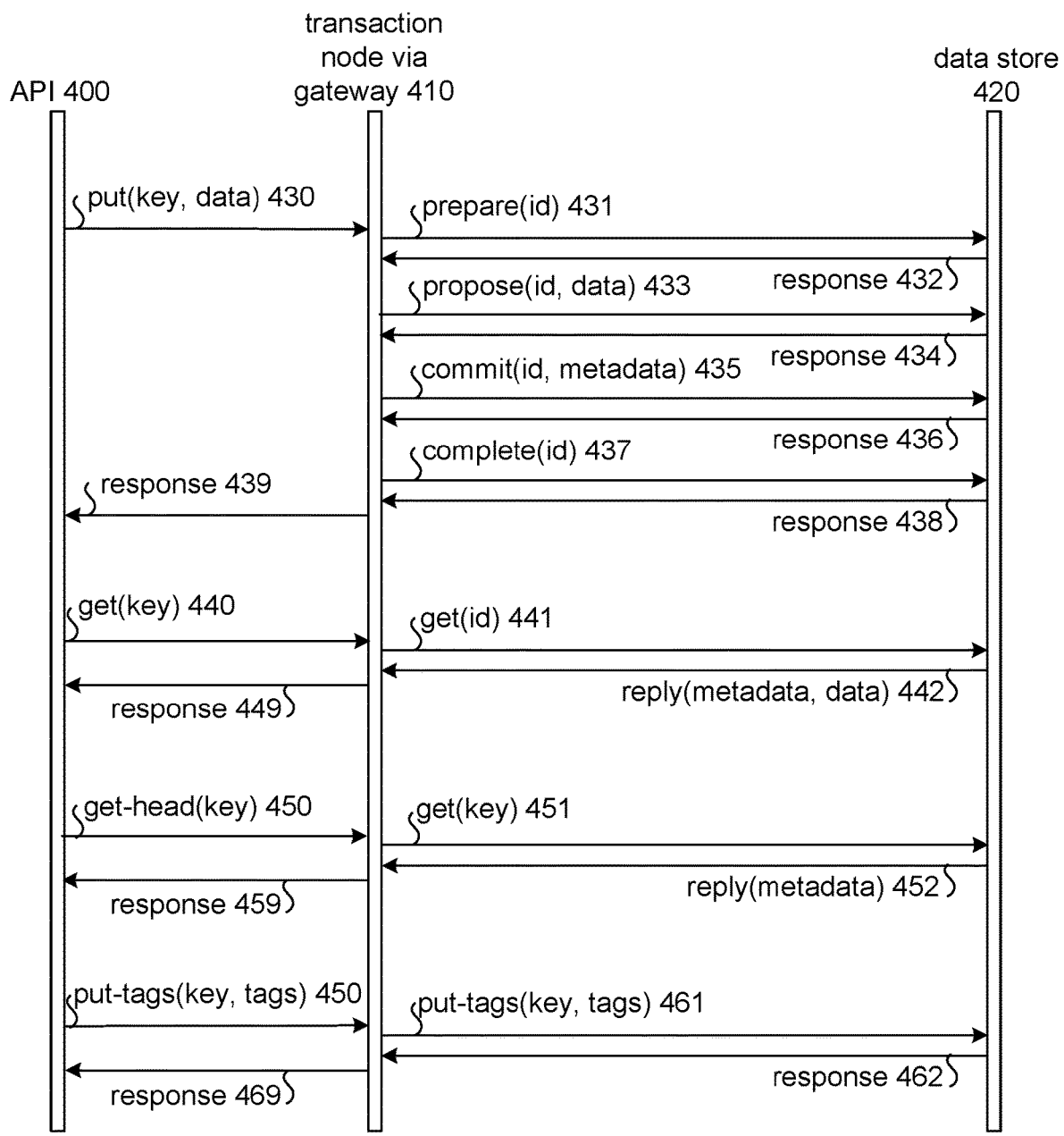
FIG. 4 is a timing diagram illustrating performance of various operations of a lockless, leaderless transaction protocol for a scalable database, according to some embodiments.

FIG. 4 is a timing diagram illustrating performance of various operations of a lockless, leaderless transaction protocol for a scalable database or data store, according to some embodiments. Various operations of a lockless, leaderless transaction protocol may be received at an application programming interface 400 or other programmatic interface. These operations may be forwarded to an operation, transaction or query processor of a transaction node 410, such as the agent 135 as shown in FIG. 1. In some embodiments, different processors at different transaction nodes may support only subsets of the lockless, leaderless transaction protocol. In these embodiments, the API 400 may forward operations to selected transaction nodes 410 via a gateway that selects a transaction node to perform the operation according to operation type and supported subsets of operations at the selected transaction node. In other embodiments, a transaction node may function as a gateway that routes operations not included in its supported subset to another transaction node. These examples are not intended to be limiting, and other methods of routing operation requests may be envisioned.

A put operation may be requested 430 of the transaction node 410, the operation including an object key and put data. This put operation may modify an existing object identified by the key or may create a new object accessible via the provided object key, in some embodiments. In some cases, the put operation may be a versioned put operation, where a version number may be additionally provided, either as part of the object key or as a separate argument of the operation (not shown).

The transaction node may then generate an identifier, or composite key, that includes at least the object key, a sequence number and optionally versioning information. The sequence number may be a number generated monotonically, either as strictly increasing or strictly decreasing, such that a creation sequence may be unambiguously determined, that is globally unique for the scalable database. This sequence number may be generated with the assistance of a sequence number generator for the scalable database and may be generated without use of a global lock despite potential parallel access by various transaction nodes within the scalable database. Various embodiments of lockless sequence number generators may be envisioned, such as by using atomic operations, such that embodiments of lockless, leaderless transaction protocol are not limited by the scope of the sequence number. Furthermore, leaderless transaction protocols may be envisioned that employ sequence number generators employing locks. Thus, various embodiments of these transaction protocols should not be considered limited to any specific sequence number generator.

The transaction node may then send a prepare command 431 to a data store 420 for creation of a data object to be accessible with the generated id. Responsive to this prepare command, the data store 420 may check for conflicts in creation of the object, create a staging area for object creation and create a snapshot of a data object being updated, if any, in some embodiments. Upon completion, the data store 420 may return a completion response 432.

The transaction node may then send a propose command 433 to a data store 420, the propose command including data to write to, or update, the data object. Responsive to this propose command, the data store 420 may create a new object state in the staging area for the object, in some embodiments. Upon completion, the data store 420 may return a completion response 434.

The transaction node may then send a commit command 435 to a data store 420, the commit command including metadata to add to the data object. Responsive to this commit command, the data store 420 may add the metadata to a new object, in some embodiments. Upon completion, the data store 420 may return a completion response 436.

The transaction node may then send a complete command 437 to a data store 420. Responsive to this complete command, the data store 420 may move the object from the staging area to a final storage location, and define the state of the data object as the newly created object state such that the data object becomes visible to future transactions, in some embodiments. Upon completion, the data store 420 may destroy the staging area and may return a completion response 438. The transaction node may then, responsive to completion of the complete operation, return a completion response 439 for the put operation, in some embodiments.

A get operation may be requested 440 of the transaction node 410, the operation including an object key. This get operation may read an existing object identified by the key, in some embodiments. In some cases, the get operation may be a versioned get operation, where a version number may be additionally provided, either as part of the object key or as a separate argument of the operation (not shown).

The transaction node may then generate an identifier, or composite key, that includes at least the object key, a sequence number and optionally versioning information. The sequence number may be a monotonic number assigned each time a new version of the object was created. To perform an unversioned get, a current sequence number for the data object may be used, in some embodiments, while to perform a versioned get, a sequence number corresponding to the provided version number may be selected. Monotonic sequence numbers are either strictly increasing or strictly decreasing such that a creation sequence may be unambiguously determined, that is globally unique for the scalable database.

The transaction node may send a get command 441 to a data store 420 to read of a data object identified by the generated composite key. Responsive to this read-head command, the data store 420 may read data and metadata of the data object, and upon completion, the data store 420 may return the data and/or metadata of the data object 442. The transaction node may then, responsive to completion of the get operation, return a completion response 449 for the get operation, in some embodiments.

A get-head operation may be requested 450 of the transaction node 410, the operation including an object key. This get-head operation may read metadata for an existing object identified by the key, in some embodiments. FIG. 4

The transaction node may send a get-head command 451 to a data store 420 to read metadata of a data object identified by the user key. Responsive to this read command, the data store 420 may read metadata of the data object, and upon completion, the data store 420 may return the metadata of the data object 452. The transaction node may then, responsive to completion of the get operation, return a completion response 459 for the get operation, in some embodiments.

A put-tags operation may be requested 460 of the transaction node 410, the operation including an object key. This get-head operation may put metadata such as tags for an existing object identified by the user key, in some embodiments.

The transaction node may send a put-tags command 461 to a data store 420 to put metadata of a data object identified by the user key. Responsive to this put-tags command, the data store 420 may associate the tags/metadata with the data object, and upon completion, the data store 420 may return a response 462. The transaction node may then, responsive to completion of the get operation, return a completion response 469 for the put-tags operation, in some embodiments.

Figure 5:
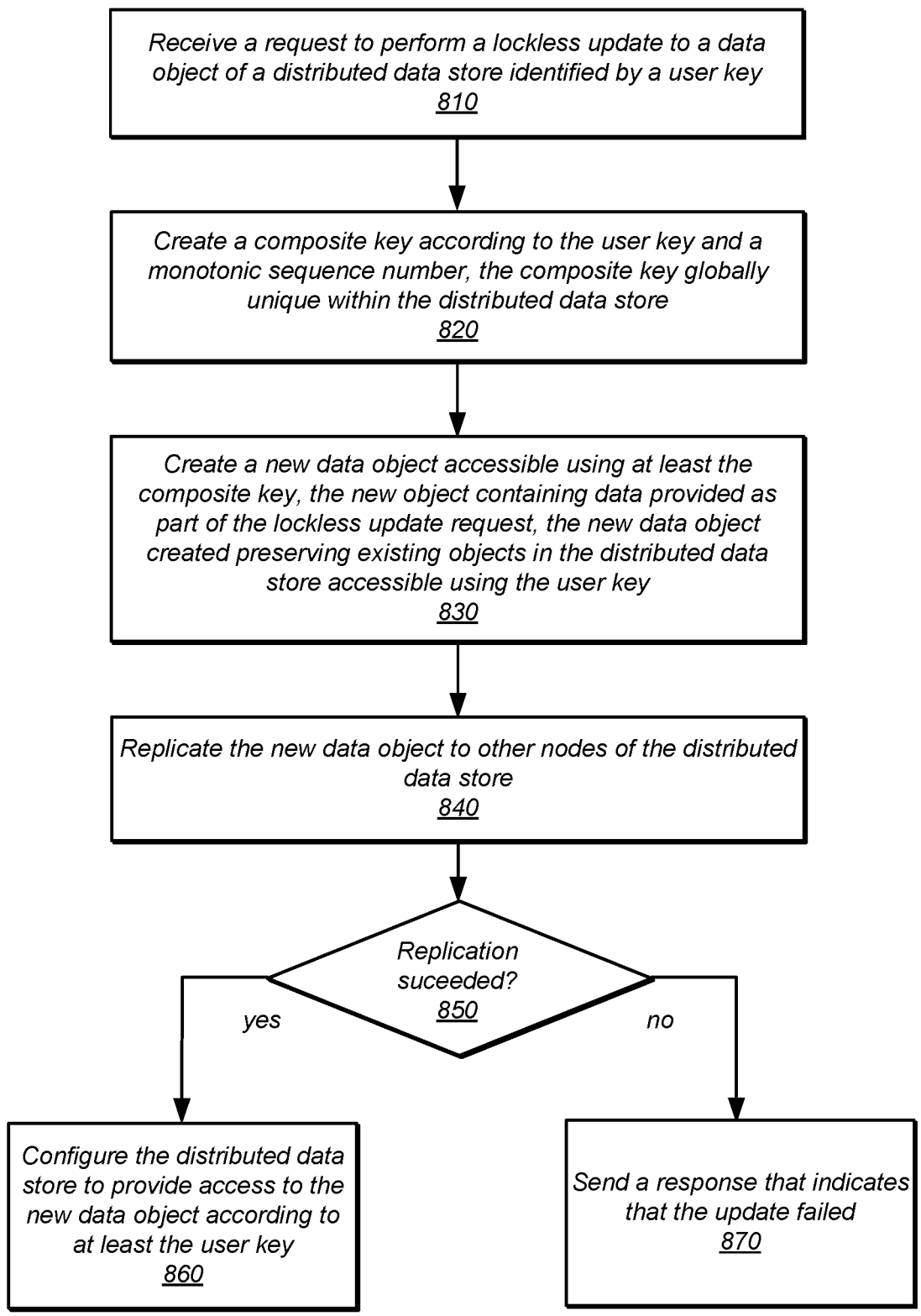
FIG. 5 is a high-level flowchart illustrating various methods and techniques to implement a lockless update operation of a lockless, leaderless transaction protocol, according to some embodiments.

FIG. 5 is a high-level flowchart illustrating various methods and techniques to implement a lockless update operation of a lockless, leaderless transaction protocol, according to some embodiments. The process begins at 810 when a request may be received to perform a lockless update to a data object, the object identified by a user key provided in the request. The request may be received via an application programming interface, such as the API 140 of FIG. 1, or other programmatic interface. These operations may be forwarded to an operation, transaction or query processor of a transaction node, such as the processor agent 135 as shown in FIG. 1. In some embodiments, different processors at different transaction nodes may support only subsets of the lockless, leaderless transaction protocol. In these embodiments, the API 700 may forward operations to selected transaction nodes 710 via a gateway that selects a transaction node to perform the operation according to operation type and supported subsets of operations at the selected transaction node. In other embodiments, a transaction node may function as a gateway that routes operations not included in its supported subset to another transaction node.

These examples are not intended to be limiting, and other methods of routing operation requests may be envisioned.

As shown in 820, a composite key may be generated that includes at least the user key, a sequence number and optional versioning information. The sequence number may be a monotonic number, either strictly increasing or strictly decreasing such that a creation sequence may be unambiguously determined, that is globally unique for the scalable database. This sequence number may be generated with the assistance of a sequence number generator for the scalable database and may be generated without use of a global lock despite potential parallel access by various transaction nodes within the scalable database. Various embodiments of lockless sequence number generators may be envisioned, such as by using atomic operations, such that embodiments of lockless, leaderless transaction protocol are not limited by the scope of the sequence number. Furthermore, leaderless transaction protocols may be envisioned that employ sequence number generators employing locks. Thus, various embodiments of these transaction protocols should not be considered limited to any specific sequence number generator.

As shown in 830, a new data object may then be created that is accessible using the composite key. By ensuring that the sequence number is generated monotonically and globally unique, creating and writing a particular data object may limited to one and only one operation exclusively, eliminating write contentions with other writing transaction nodes, in some embodiments. The newly created data object may then be updated to include data provided in the request, such as shown in steps 433-436 in FIG. 4. In the event the data object is a new data object not dependent on a previous version of the data object, the data written to the data object may be limited to only the data included in the update request, however if the data object depends on a previous version, the data may also include data of the previous version not modified or updated by the request or the data may only include modifications or change descriptions relative to the previous version. Particular techniques for writing data to the newly created data object and representing the data of the data object may vary in different embodiments and the above examples are not intended to be limiting. Upon completion of writing the data to the new data object, future accesses to the data object may be read-only, making the data object immutable.

As shown in 840, the new data object may then be synchronously replicated to one or more other nodes as shown in greater detail in FIG. 12 below. Should this replication fail, as shown in a negative exit at 850, a response indicating failure of the update operation may be returned, as shown in 870. If, however, the replication succeeds, as shown in a positive exit at 850, the process may advance to 860 where the distributed data store may be configured to provide access to the new data object according to the user key.

Figure 6:
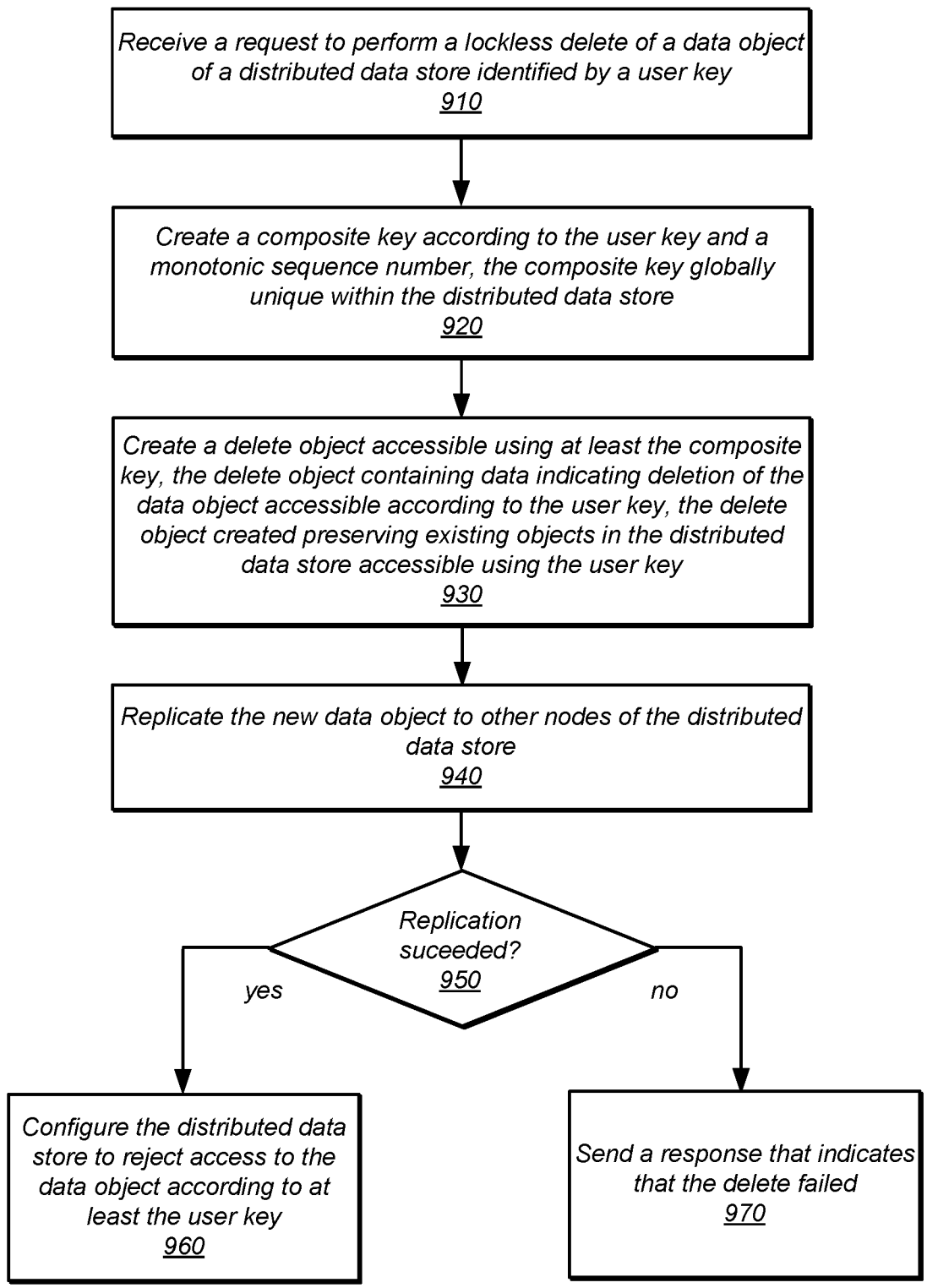
FIG. 6 is a high-level flowchart illustrating various methods and techniques to implement a lockless delete operation of a lockless, leaderless transaction protocol, according to some embodiments.

FIG. 6 is a high-level flowchart illustrating various methods and techniques to implement a lockless delete operation of a lockless, leaderless transaction protocol, according to some embodiments. The process begins at 910 when a request may be received to perform a lockless delete of a data object, the object identified by a user key provided in the request. The request may be received via an application programming interface, such as the API 400 of FIG. 4, or other programmatic interface. These operations may be forwarded to an operation, transaction or query processor of a transaction node, such as the query processors 421 as shown in FIG. 4. In some embodiments, different processors at different transaction nodes may support only subsets of the lockless, leaderless transaction protocol. In these embodiments, the API 700 may forward operations to selected transaction nodes 710 via a gateway that selects a transaction node to perform the operation according to operation type and supported subsets of operations at the selected transaction node. In other embodiments, a transaction node may function as a gateway that routes operations not included in its supported subset to another transaction node. These examples are not intended to be limiting, and other methods of routing operation requests may be envisioned.

As shown in 920, a composite key may be generated that includes at least the user key, a sequence number and optional versioning information. The sequence number may be a monotonic number, either strictly increasing or strictly decreasing such that a creation sequence may be unambiguously determined, that is globally unique for the scalable database. This sequence number may be generated with the assistance of a sequence number generator for the scalable database and may be generated without use of a global lock despite potential parallel access by various transaction nodes within the scalable database. Various embodiments of lockless sequence number generators may be envisioned, such as by using atomic operations, such that embodiments of lockless, leaderless transaction protocol are not limited by the scope of the sequence number. Furthermore, leaderless transaction protocols may be envisioned that employ sequence number generators employing locks. Thus, various embodiments of these transaction protocols should not be considered limited to any specific sequence number generator.

As shown in 930, a delete object may then be created that is identifiable using the composite key. By ensuring that the sequence number is generated monotonically and is globally unique, creating and writing any particular data object may limited to one and only one operation exclusively, eliminating contentions with other transaction nodes, in some embodiments. The newly created delete object may then be updated to indicate deletion of the data object accessible according to the user key. Upon completion of writing the data to the new data object, future accesses to the data object may be read-only, making the data object immutable.

As shown in 940, the delete object may then be synchronously replicated to one or more other nodes as shown in greater detail in FIG. 12 below. Should this replication fail, as shown in a negative exit at 950, a response indicating failure of the delete operation may be returned, as shown in 970. If, however, the replication succeeds, as shown in a positive exit at 950, the process may advance to 960 where the distributed data store may be configured to reject access to the data object according to the user key.

Figure 7:
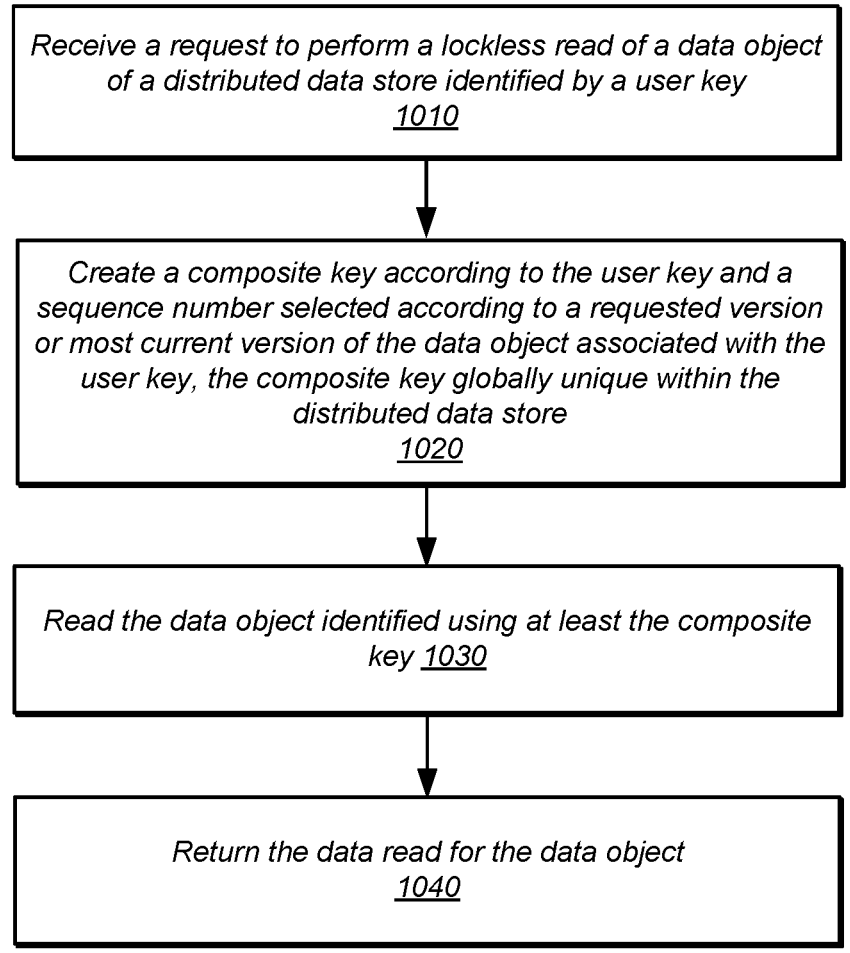
FIG. 7 is a high-level flowchart illustrating various methods and techniques to implement a lockless read operation of a lockless, leaderless transaction protocol, according to some embodiments.

FIG. 7 is a high-level flowchart illustrating various methods and techniques to implement a lockless read operation of a lockless, leaderless transaction protocol, according to some embodiments. The process begins at 1010 when a request may be received to perform a lockless read of a data object, the object identified by a user key provided in the request. The request may be received via an application programming interface, such as the API 400 of FIG. 4, or other programmatic interface. These operations may be forwarded to an operation, transaction or query processor of a transaction node, such as the processor agent 135 as shown in FIG. 1. In some embodiments, different processors at different transaction nodes may support only subsets of the lockless, leaderless transaction protocol. In these embodiments, the API 700 may forward operations to selected transaction nodes 710 via a gateway that selects a transaction node to perform the operation according to operation type and supported subsets of operations at the selected transaction node. In other embodiments, a transaction node may function as a gateway that routes operations not included in its supported subset to another transaction node. These examples are not intended to be limiting, and other methods of routing operation requests may be envisioned.

As shown in 1020, a composite key may be generated that includes at least the user key, a sequence number and optional versioning information. The sequence number may be a monotonically generated number, either strictly increasing or strictly decreasing such that a creation sequence may be unambiguously determined, that is globally unique for the scalable database. This sequence number may be generated with the assistance of a sequence number generator for the scalable database and may be generated without use of a global lock despite potential parallel access by various transaction nodes within the scalable database. Various embodiments of lockless sequence number generators may be envisioned, such as by using atomic operations, such that embodiments of lockless, leaderless transaction protocol are not limited by the scope of the sequence number. Furthermore, leaderless transaction protocols may be envisioned that employ sequence number generators employing locks. Thus, various embodiments of these transaction protocols should not be considered limited to any specific sequence number generator.

As shown in 1030, data for a data object identified by at least the composite key may then be read. In some embodiments, the reading of data from the identified data object may involve the reading of one or more additional data objects that the identified data object depends on. Once data for the identified data object is read, as shown in 1040 the data read from the object may be returned, in some embodiments.

Figure 8:
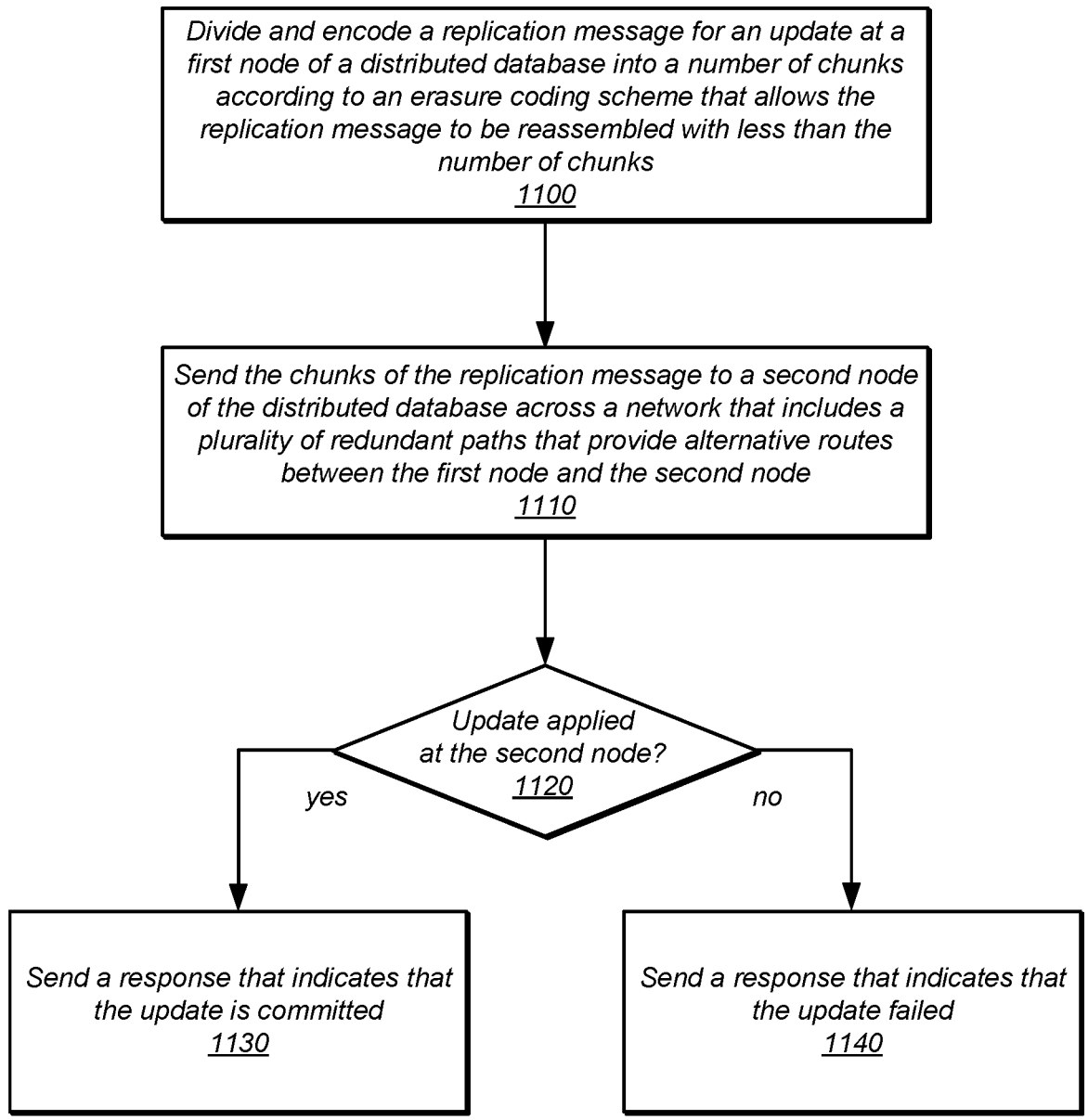
FIG. 8 is a high-level flowchart illustrating various methods and techniques to implement replication of data using erasure coding, according to some embodiments.

FIG. 8 is a high-level flowchart illustrating various methods and techniques to implement replication of data using erasure coding, according to some embodiments. As indicated at 1100, a replication message for an update to a data object may be divided and encoded at a first node into a number of chunks according to an erasure coding scheme that allows the replication message to be reassembled with less than the number of chunks, according to some embodiments. As discussed above with regard to FIG. 3, many different erasure coding schemes may be applied, including, but not limited to simple parity, Reed-Solomon, or other Maximum Distance Separable Codes (for arbitrary N>k), or rateless erasure coding schemes such as Fountain codes and Raptor codes.

As indicated at 1110, the chunks of the replication message may be sent to a second node of a distributed database across a network that includes a plurality of redundant paths that provide alternative routes between the first node and the second node, according to some embodiments. The second node may be identified according to the respective replication protocol or technique that is applied. For instance, the second node may be a follower node that applies writes committed by a leader node, such as the first node. In some embodiments, the second node may be a participant in a conflict check or other write resolution technique that is satisfied if a certain number (or all) other nodes agree to commit or perform the update described in the replication message. The replication message may be sent to more than the second node (e.g., to one or more further database nodes). The same erasure coding technique and chunks may be re-used or in some embodiments, different erasure coding techniques or chunks may be used.

As indicated at 1, a determination may be made as to whether an acknowledgement for the write has been received. If so, then a response to the request may be sent indicating that the update is committed to the database may be sent, as indicated at 1130. If not, then a response to the request may be sent indicating that the update failed, in some embodiments. As discussed above, different types, numbers, and sources of acknowledgements may be received according to the type of replication protocol that is implemented.

Figure 9:
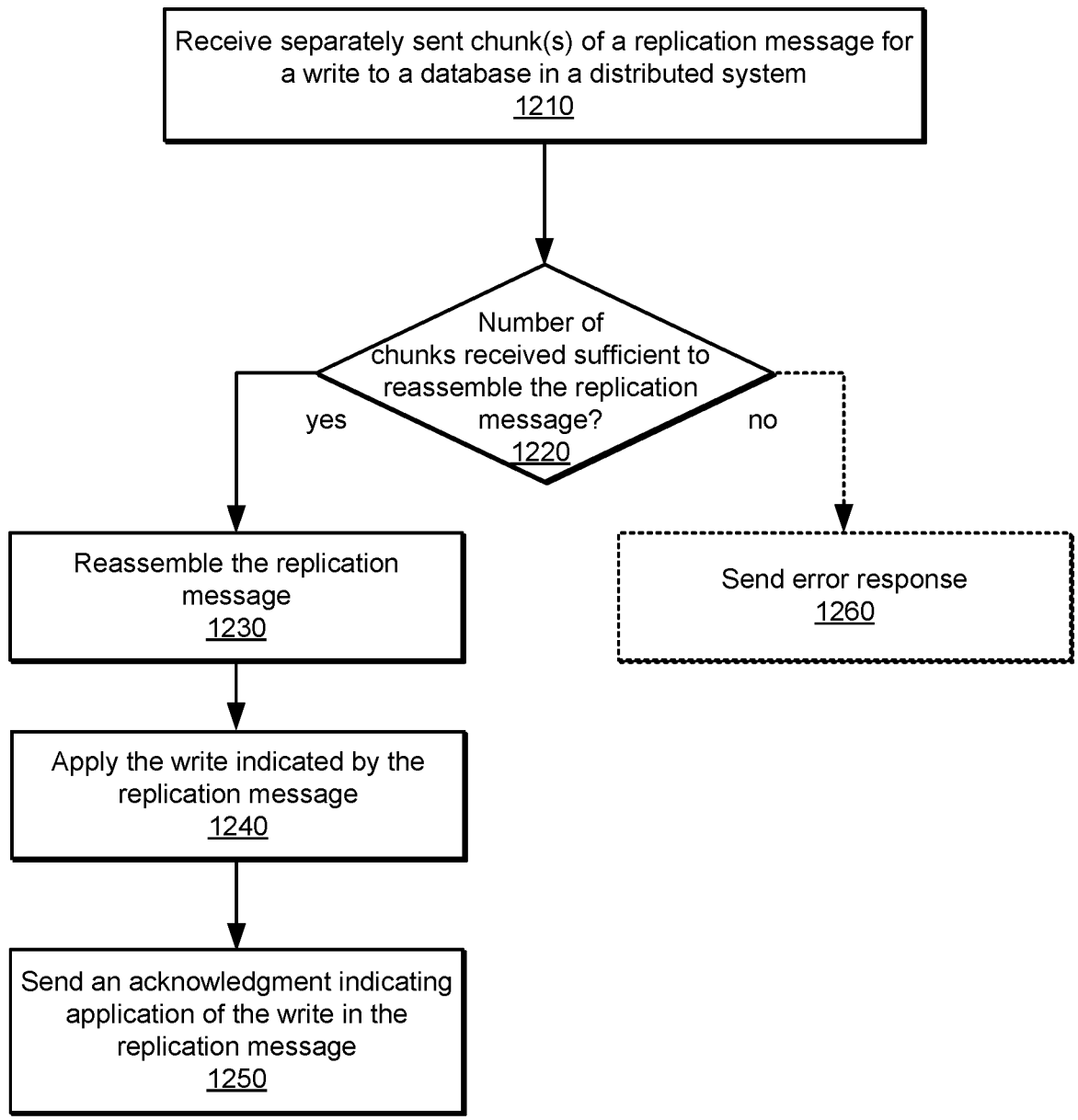
FIG. 9 is a high-level flowchart illustrating various methods and techniques to implement reassembly of replication message chunks using erasure coding, according to some embodiments, according to some embodiments.

FIG. 9 is a high-level flowchart illustrating various methods and techniques to implement reassembly of replication message chunks using erasure coding, according to some embodiments. As indicated at 1210, separately sent chunk(s) of a replication message for a write to a database in a distributed database system may be received, according to some embodiments. For example, the chunks may be received directly from the sending database instance. In some embodiments, one or more chunks may be received from other recipients of the chunks that are also acknowledging the replication message using a gossip or other protocol that exchanges information between recipient instances of replication messages.

As indicated at 1220, a determination may be made that a sufficient number of chunks to reassemble the replication have been received. If not, an error response may be sent 1260 (or further waiting for other chunks). In some embodiments, further chunks may be received from other recipient database instances. In some embodiments, a request may be sent to the transmitting database instance for the missing chunk(s) that are needed to reassemble the replication message.

As indicated at 1230, the chunks may be reassembled into the replication message according to the erasure coding scheme. In some embodiments, a parameter, flag, or other information may be specified or indicated to the recipient database instance as to which erasure coding scheme is applied. In some embodiments, a default erasure coding scheme may be applied. As indicated at 1240, the write may be applied that is indicated by the replication message, in some embodiments. As indicated at 1250, an acknowledgement indicating application of the write may be sent.

The methods described herein may in various embodiments be implemented by any combination of hardware and software. For example, in one embodiment, the methods may be implemented on or across one or more computer systems (e.g., a computer system as in FIG. 10) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
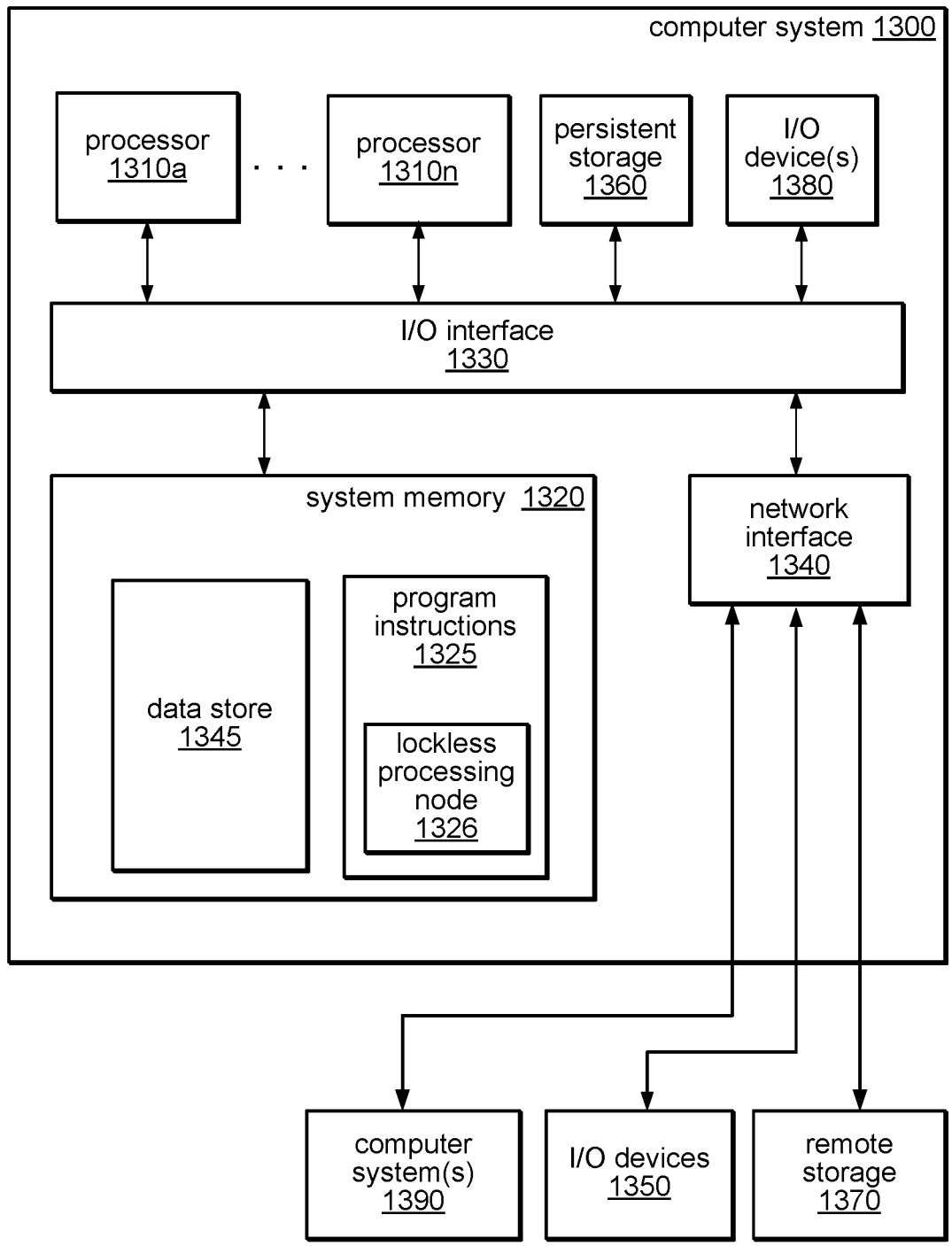
FIG. 10 is a block diagram illustrating an example computer system, according to various embodiments.

FIG. 10 is a block diagram illustrating an example computer system, according to various embodiments. For example, computer system 1000 may implement synchronous database replication using erasure coding, in various embodiments. Computer system 1300 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1300 includes one or more processors 1310 (any of which may include multiple cores, which may be single or multi-threaded) coupled to a system memory 1320 via an input/output (I/O) interface 1330. Computer system 1300 further includes a network interface 1340 coupled to I/O interface 1330. In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. The computer system 1300 also includes one or more network communication devices (e.g., network interface 1340) for communicating with other systems and/or components over a communications network (e.g. Internet, LAN, etc.). For example, a client application executing on system 1300 may use network interface 1340 to communicate with a server application executing on a single server or on a cluster of servers that implement one or more of the components of the database systems described herein. In another example, an instance of a server application executing on computer system 1300 may use network interface 1340 to communicate with other instances of the server application (or another server application) that may be implemented on other computer systems (e.g., computer systems 1390).

In the illustrated embodiment, computer system 1300 also includes one or more persistent storage devices 1360 and/or one or more I/O devices 1380. In various embodiments, persistent storage devices 1360 may correspond to disk drives, tape drives, solid state memory, other mass storage devices, or any other persistent storage device. Computer system 1300 (or a distributed application or operating system operating thereon) may store instructions and/or data in persistent storage devices 1360, as desired, and may retrieve the stored instruction and/or data as needed. For example, in some embodiments, computer system 1300 may host a storage system server node, and persistent storage 1360 may include the SSDs attached to that server node.

Computer system 1300 includes one or more system memories 1320 that may store instructions and data accessible by processor(s) 1310. In various embodiments, system memories 1320 may be implemented using any suitable memory technology, (e.g., one or more of cache, static random access memory (SRAM), DRAM, RDRAM, EDO RAM, DDR RAM, synchronous dynamic RAM (SDRAM), Rambus RAM, EEPROM, non-volatile/Flash-type memory, or any other type of memory). System memory 1320 may contain program instructions 1325 that are executable by processor(s) 1310 to implement the methods and techniques such as a lockless, leaderless processing node 1326 as described herein. In various embodiments, program instructions 1325 may be encoded in platform native binary, any interpreted language such as Java™ byte-code, or in any other language such as C/C++, Java™, etc., or in any combination thereof. In some embodiments, program instructions 1325 may implement multiple separate clients, server nodes, and/or other components.

In some embodiments, program instructions 1325 may include instructions executable to implement an operating system (not shown), which may be any of various operating systems, such as UNIX, LINUX, Solaris™, MacOS™, Windows™, etc. Any or all of program instructions 1325 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1300 via I/O interface 1330. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1300 as system memory 1320 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1340.

In some embodiments, system memory 1320 may include data store 1345, which may be configured as described herein. In one embodiment, I/O interface 1330 may coordinate I/O traffic between processor 1310, system memory 1320 and any peripheral devices in the system, including through network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments, some or all of the functionality of I/O interface 1330, such as an interface to system memory 1320, may be incorporated directly into processor 1310.

Network interface 1340 may allow data to be exchanged between computer system 1300 and other devices attached to a network, such as other computer systems 1390 (which may implement one or more storage system server nodes, primary nodes, read-only node nodes, and/or clients of the database systems described herein), for example. In addition, network interface 1340 may allow communication between computer system 1300 and various I/O devices 1350 and/or remote storage 1370. Input/output devices 1350 may, in some embodiments, include one or more display terminals, keyboards, keypads, touchpads, scanning devices, voice or optical recognition devices, or any other devices suitable for entering or retrieving data by one or more computer systems 1300. Multiple input/output devices 1350 may be present in computer system 1300 or may be distributed on various nodes of a distributed system that includes computer system 1300. In some embodiments, similar input/ output devices may be separate from computer system 1300 and may interact with one or more nodes of a distributed system that includes computer system 1300 through a wired or wireless connection, such as over network interface 1340. Network interface 1340 may commonly support one or more wireless networking protocols (e.g., Wi-Fi/IEEE 802.11, or another wireless networking standard). However, in various embodiments, network interface 1340 may support communication via any suitable wired or wireless general data networks, such as other types of Ethernet networks, for example. Additionally, network interface 1340 may support communication via telecommunications/telephony networks such as analog voice networks or digital fiber communications networks, via storage area networks such as Fibre Channel SANs, or via any other suitable type of network and/or protocol. In various embodiments, computer system 1300 may include more, fewer, or different components than those illustrated in FIG. 5 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:
a plurality of heterogeneous nodes, individual comprising one or more processors and a memory, implementing different subsets of lockless access operations, including a lockless update, for a plurality of data objects of a distributed data store, wherein:
   individual ones of the plurality of heterogeneous nodes are configured to perform respective lockless updates to a data object of the plurality of data objects, wherein to perform a lockless update, a particular node is configured to:
      create a new data object accessible via a composite key comprising a sequence number generated monotonically, wherein the composite key is globally unique with respect to the distributed data store; and
      write data comprising at least changed data implementing the update to the data object to the new data object, wherein subsequent to writing the data the new data object is immutable; and
   a node of the plurality of nodes is configured to perform a lockless delete of the data object, wherein to perform the lockless delete the node is configured to:
      create a delete object accessible via another composite key comprising another sequence number generated monotonically, wherein the other composite key is globally unique with respect to the distributed data store; and
      write data indicating deletion of the data object to the delete object, wherein, subsequent to writing the data, the delete object is made immutable, and wherein the delete object indicates that readers of the data object ignore other data objects accessible using sequence numbers generated monotonically before the other sequence number.

2. The system of claim 1, wherein the plurality of heterogeneous nodes individually implement indexing for the respective copies of the distributed database according to the respective different subsets of access operations.

3. The system of claim 1, wherein to write the data to the new data object the particular node is configured to:
synchronously replicate the data to the data store to another node of the plurality of nodes, wherein to synchronously replicate the data the particular node is configured to:
   divide and encode the data into a number of chunks according to an erasure coding scheme, wherein the erasure coding scheme allows the data to be reassembled with less than the number of chunks;
   send the chunks to the other node across a network that includes a plurality of redundant paths that provide alternative routes between the particular node and the other node; and
   receive an acknowledgement that the data has been written by the other node.

4. The system of claim 1, wherein a particular lockless update is a versioned update, wherein a particular composite key for the particular lockless update is based at least in part on a version number of the update, and wherein the method further comprises:
performing, responsive to receiving a read request for the data object comprising the version number by a node of the plurality of nodes, a lockless read of the data object, wherein to perform the particular lockless update, a node of the plurality of nodes is configured to:
  identify another data object according to particular composite key for the data object;
  return data for the data object based at least in part of the data written to the other data object.

5. A method, comprising:
performing, by individual ones of a plurality of nodes each comprising at least one processor and a memory, respective lockless updates to a data object of a distributed data store, comprising:
  creating a new data object accessible via an identifier comprising a sequence number generated monotonically, wherein the identifier is globally unique with respect to the distributed data store; and
  writing data comprising at least changed data implementing the update to the data object to the new data object, wherein subsequent to writing the data the new data object is immutable.

6. The method of claim 5, further comprising:
performing, by a node of the plurality of nodes, a lockless delete of the data object, comprising:
  creating another data object accessible via another identifier comprising another sequence number generated monotonically, wherein the other identifier is globally unique with respect to the distributed data store; and
  writing data indicating deletion of the data object to the other new data object, wherein subsequent to writing the data the new data object is made immutable, and wherein the new data object indicates that readers of the data object ignore other data objects accessible using sequence numbers generated monotonically before the other sequence number.

7. The method of claim 5, further comprising:
performing, by a node of the plurality of nodes, a lockless read of the data object, comprising:
  identifying another data object according to a most recent sequence number for the data object;
  returning data for the data object based at least in part of the data written to the other data object.

8. The method of claim 5, wherein a particular lockless update is a versioned update, wherein a particular identifier for the particular lockless update is based at least in part on a version number of the update, and wherein the method further comprises:
performing, responsive to receiving a read request for the data object comprising the version number by a node of the plurality of nodes, a lockless read of the data object, comprising:
  identifying another data object according to particular identifier for the data object;
  returning data for the data object based at least in part of the data written to the other data object.

9. The method of claim 5, wherein writing the data to the new data object comprises:
synchronously replicating, by a first node of the plurality of nodes performing the update, the data to a second node of the plurality of nodes, comprising:
  dividing and encoding the data into a number of chunks according to an erasure coding scheme, wherein the erasure coding scheme allows the data to be reassembled with less than the number of chunks;
  sending the chunks to the second node across a network that includes a plurality of redundant paths that provide alternative routes between the first node and the second node; and
  receiving, at the first node, an acknowledgement that the data has been written by the second node.

10. The method of claim 5, wherein the plurality of nodes are heterogeneous nodes implementing different subsets of access operations, including the lockless update, for data objects of the distributed data store, and wherein the method further comprises:
receiving at a first node of the plurality of nodes, a request to perform an operation of the plurality of operations not supported at the first node, and responsive to receiving the request forward the request to a second node of the plurality of nodes.

11. The method of claim 10, wherein the plurality of heterogeneous nodes individually implement indexing for the respective copies of the distributed database according to the respective different subsets of access operations.

12. The method of claim 5, wherein individual ones of the plurality of nodes of the distributed data store are implemented in respective different ones of a plurality of geographic regions, and wherein the distributed data store is provided as part of a provider network.

13. One or more non-transitory computer-accessible storage media storing program instructions that when executed on or across one or more computing devices cause the one or more computing devices to implement:
performing, by individual ones of a plurality of nodes, respective lockless updates to a data object of a distributed database, comprising:
  creating a new data object accessible via a key comprising a monotonic sequence number, wherein the key is globally unique with respect to the distributed data store; and
  writing data comprising at least changed data implementing the update to the data object to the new data object, wherein subsequent to writing the data the new data object is immutable.

14. The one or more non-transitory computer-accessible storage media of claim 13, the program instructions that when executed on or across one or more computing devices cause the one or more computing devices to further implement:
performing, by a node of the plurality of nodes, a lockless delete of the data object, comprising:
  creating a delete object accessible via another key comprising another monotonic sequence number, wherein the other key is globally unique with respect to the distributed data store; and
  writing data indicating deletion of the data object to the delete object, wherein subsequent to writing the data the delete object is made immutable, and wherein the delete object indicates that readers of the data object ignore other data objects accessible using monotonic sequence numbers before the other monotonic sequence number.

15. The one or more non-transitory computer-accessible storage media of claim 13, the program instructions that when executed on or across one or more computing devices cause the one or more computing devices to further implement:
performing, by a node of the plurality of nodes, a lockless read of the data object, comprising:

identifying another data object according to a most recent monotonic sequence number for the data object;

returning data for the data object based at least in part of the data written to the other data object.

16. The one or more non-transitory computer-accessible storage media of claim 15, wherein a particular lockless update is a versioned update, wherein a particular key for the particular lockless update is based at least in part on a version number of the update, and wherein the program instructions that when executed on or across the one or more computing devices cause the one or more computing devices to implement:

performing, responsive to receiving a read request for the data object comprising the version number by a node of the plurality of nodes, a lockless read of the data object, comprising:

identifying another data object according to particular key for the data object;

returning data for the data object based at least in part of the data written to the other data object.

17. The one or more non-transitory computer-accessible storage media of claim 13, wherein writing the data comprises:

synchronously replicating, by a first node of the plurality of nodes performing the update, the data to a second node of the plurality of nodes, comprising:

dividing and encoding the data into a number of chunks according to an erasure coding scheme, wherein the erasure coding scheme allows the data to be reassembled with less than the number of chunks;

sending the chunks to the second node across a network that includes a plurality of redundant paths that provide alternative routes between the first node and the second node; and receiving, at the first node, an acknowledgement that the data has been written by the second node.

18. The one or more non-transitory computer-accessible storage media of claim 13, wherein the plurality of nodes are heterogeneous nodes implementing different subsets of access operations, including the lockless update, for data objects of the distributed database, and wherein the program instructions that when executed on or across the one or more computing devices cause the one or more computing devices to implement:

receiving at a first node of the plurality of nodes, a request to perform an operation of the plurality of operations not supported at the first node, and responsive to receiving the request forward the request to a second node of the plurality of nodes.

19. The one or more non-transitory computer-accessible storage media of claim 18, wherein the plurality of heterogeneous nodes individually implement indexing for the respective copies of the distributed database according to the respective different subsets of access operations.

20. The one or more non-transitory computer-accessible storage media of claim 13, wherein individual ones of the plurality of nodes of the distributed database are implemented in respective different ones of a plurality of geographic regions, and wherein the distributed database is provided as part of a provider network.

* * * * *